United States Patent [11] 3,603,400

[72] Inventor Marion O. Son, Jr.
           Littleton, Colo.
[21] Appl. No. 20,099
[22] Filed Mar. 16, 1970
[45] Patented Sept. 7, 1971
[73] Assignee Marathon Oil Company
           Findlay, Ohio

[54] FRACTURING SUBTERRANEAN FORMATIONS USING MICELLAR DISPERSIONS
     19 Claims, No Drawings

[52] U.S. Cl. .................................... 166/308,
                                                252/8.55 R
[51] Int. Cl. ................................... E21b 43/26
[50] Field of Search .......................... 166/308,
                        274, 273, 250, 271, 281; 252/8.55 R

[56]              References Cited
              UNITED STATES PATENTS
2,802,531  8/1957  Cardwell et al. ............  166/308 X
2,898,294  8/1959  Priest et al. .................  252/8.55 R
2,965,172  12/1960 DaRoza .......................  166/308
3,254,719  6/1966  Root ...........................  166/308
3,275,075  9/1966  Gogarty et al. ..............  166/274
3,307,628  3/1967  Send ...........................  166/274
3,330,343  7/1967  Tosch et al. .................  166/274 X
3,356,138  12/1967 Davis, Jr. et al. ............  166/274
3,378,074  4/1968  Kiel ............................  166/308
3,451,480  6/1969  Zeh, Jr. et al. ..............  166/308
3,500,932  3/1970  Webb ..........................  166/308

Primary Examiner—Stephen J. Novosad
Attorneys—Joseph C. Herring, Richard C. Willson, Jr. and Jack L. Hummel ABSTRACT: A subterranean formation is fractured by injecting under fracturing pressures a micellar dispersion comprised of hydrocarbon, aqueous medium, and surfactant. Propping agents are useful in the dispersion. Also, the viscosity of the dispersion is designed to obtain "low penetrating fluids."

FRACTURING SUBTERRANEAN FORMATIONS USING MICELLAR DISPERSIONS

CROSS REFERENCE TO RELATED APPLICATION

U.S. Pat. application Ser. No. 762,141, filed Sept. 24, 1968, now U.S. Pat. No. 3,500,932, teaches the injection of a micellar dispersion into a formation to be fractured previous to the injection of a fracturing fluid. The micellar dispersion is utilized as a prefrac fluid to clean the perforations, formation, and to minimize emulsion in the well bore area.

BACKGROUND OF THE INVENTION

1. Field of the Invention

This invention relates to the hydraulic fracturing of subterranean hydrocarbon-bearing formations penetrated by a well.

2. Description of the Prior Art

Hydrocarbon-bearing subterranean formations often are contaminated with cement, drilling mud, foreign particles, contain emulsion blocks, etc., or otherwise lack natural formation pressure. Such can adversely affect the production of hydrocarbon from the formation. One way of overcoming these adversities is to fracture the formation to facilitate the movement of hydrocarbons via permeable channels which are formed and which extend from the formation to the well bore.

U.S. Pat. No. 3,378,074 to Kiel teaches the use of water-in-oil emulsions as fracturing agents and the use of a wetting agent to reduce friction between the injection string surface and fracturing agent.

A problem attending traditional fracturing processes lies in the instability of the particular fracturing agent employed. Conventional fracturing agents, such as emulsions, must be substantially more viscous than water for most reservoirs before fractures can be obtained using reasonable injection pressures. Oftentimes, necessary fracturing pressures tend to lower the viscosity of the fracturing agent by molecular cleavage, emulsion breakdown, etc. These fracturing agents also tend to break down or otherwise suffer a decrease in viscosity when transported to the well site. As a result, production of the fracturing agent at the well site has been necessitated. Furthermore, storage of these fracturing fluids, whether at the well site, or elsewhere, has resulted in their breakdown due to their inherent instability.

These and other disadvantages of the prior art are overcome by utilizing the novel fracturing agent and processes for its implementation according to the present invention.

DESCRIPTION OF THE INVENTION

Briefly described, the invention comprises a process for hydraulically fracturing a subterranean hydrocarbon-bearing formation penetrated by at least one well. The novel fracturing agent is a micellar dispersion comprised of hydrocarbon, aqueous media and surfactant (petroleum sulfonate) and having a viscosity of at least about cp. at ambient temperature, i.e. 22°-23° C. The fracturing agent is conventionally injected into the formation (with or without the aid of a lubricating fluid to wet the inner surface of the injection tubing), under sufficient pressure to fracture the formation. The resulting fracture increases the permeability of the formation in the vicinity of the well bore. Propping agents may be incorporated in the fracturing fluid to hold open the fractures.

The term "micellar dispersion" as used herein is meant to include micellar solutions and "microemulsions." Examples of useful micellar dispersions are included in U.S. Pat. Nos. 3,254,714, 3,275,075, 3,301,325, 3,307,628, 3,330,344, 3,348,611, and 3,497,006. The micellar dispersion can be oil-external, or water-external, but preferably is oil-external.

The micellar dispersion is, for purposes of this invention, a relatively stable dispersion. By stable is meant that the dispersions are thermodynamically stable, appearing to be single phased and substantially transparent. Equilibrium tends toward further dispersion of the internal phase rather than coagulation or coalescence, the latter is characteristic of emulsions.

The micellar dispersion A is comprised of hydrocarbon, aqueous medium, and at least one surfactant. One or more cosurfactants (also identified as cosolvents, cosolubilizers, and semipolar organic compounds) are useful, but not necessary, in the dispersions. Also, electrolytes are useful in the dispersions. Also, the micellar dispersion can contain other additives, e.g. corrosion and scale inhibitors, bactericides, etc. Examples of useful dispersions include those containing, by volume, from about 4 percent to about 90 percent hydrocarbon; from about 1 to about 70 percent or more of water, at least about 4 percent surfactant, from about 0.01 to about 20 percent or more by volume of cosurfactant and from about 0.001 or less to about 5 percent or more by weight of electrolyte in the aqueous phase.

Examples of useful hydrocarbons include crude oil, partially refined fractions thereof, e.g. side cuts from crude columns, crude column overheads, gas oils, kerosene, heavy naphthas, naphthas, straight-run gasoline, and liquefied petroleum gases, refined fractions of crude oil and halogenated hydrocarbons. Pure hydrocarbons are also useful, e.g. paraffinic compounds including liquefied petroleum gases, propane, pentane, heptane, decane, dodecane, etc.; cycloparaffin compounds including cyclohexane, etc.; aryl compounds including monocyclic and polycyclic and substituted products thereof including toluene, alkyl phenols, etc. and combinations of the hydrocarbons taught herein. Based on economics and viscosity considerations, the preferred hydrocarbon is one locally available and is crude oil. The unsulfonated hydrocarbon (e.g. heavy vacuum gas oils) in petroleum sulfonates is also useful.

The aqueous medium can be soft, brackish, or brine water. Preferably, the water is soft but it can contain small amounts of salts.

Examples of surfactants can be found in U.S. Pat. No. 3,254,714 to Gogarty et al. Preferably, the surfactant is a petroleum sulfonate, also known as alkaryl sulfonates or alkaryl naphthenic sulfonates. The sulfonate can contain less than 60 and up to 100 percent active sulfonate. Examples of preferred surfactants are the sodium and ammonium petroleum sulfonates. The sulfonates can have an average equivalent weight within the range of from about 350 to about 520, and more preferably from about 350 to about 470. By "equivalent weight" is meant the molecular weight divided by the number of sulfonate groups attached to the sulfonate molecule. The surfactant can be a mixture of low, medium and high average equivalent weight sulfonates or a mixture of different surfactants.

Examples of useful cosurfactants include alcohols, amino compounds, esters, aldehydes and ketones containing from 1 up to about 20 or more carbon atoms and more preferably from about 3 to about 16 carbon atoms. The cosurfactant is preferably an alcohol, e.g. isopropanol, n- and isobutanol, the amyl alcohols such as n-amyl alcohol, 1- and 2-hexanol, 1- and 2-octanol, decyl alcohols, alkaryl alcohols such as p-nonyl phenol, alcoholic liquors such as fusel oil, hydroxy compounds such as 2-butoxychanol, and like compounds. Particularly useful alcohols include the primary butanols, primary pentanols and secondary hexanols. Concentrations of from about 0.1 percent to more than about 10 percent by volume are preferred and more preferably from about 0.2 percent to about 3 percent. Mixtures of two or more cosurfactants are also useful.

Electrolytes useful within the micellar dispersions include inorganic bases, inorganic acids, inorganic salts, organic bases, organic acids, and organic salts. The electrolytes can be strongly or weakly ionized. Preferably, the electrolytes are inorganic bases, inorganic acids and inorganic salts, examples include sodium hydroxide sodium chloride, sodium sulfate, hydrochloric acid, sulfuric acid, sodium nitrate, ammonium chloride, ammonium hydroxide, and potassium chloride. Examples of other useful electrolytes can be found in U.S. Pat. No. 3,330,344. The type and concentration of preferred electrolyte will depend on phase, hydrocarbon phase, aqueous phase, surfactant, cosurfactant, operating conditions (e.g. temperature) compatibility with propping agents, etc.

The components of the micellar dispersion are admixed with agitation in any table manner, such as by stirring, shaking rotary stirring, A pumping to form a stable micellar dispersion. This micellar dispersion may be prepared at the well site, or elsewhere. The dispersion can be designed not to phase separate upon storage under wide temperature fluctuations.

The viscosity of the micellar dispersion fracturing agent may be varied over a wide range. The desired viscosity is selected by considering the particular well and formation to be treated. Important considerations include permeability of the formation, presence or absence of interstitial water, availability of natural brine to use as the aqueous component of the fracturing agent, diameter and friction properties of the injection string, etc. Generally, the viscosity of the fracturing agent can vary directly with the permeability of the formation; thus, for highly permeable formations, a high viscosity fracturing fluid is generally necessary bproduce sizeable fractures.

The characteristics of the micellar dispersion, especially viscosity, may be tailored to fit the particular reservoir The viscosity of the fracturing agent may also be monitored at the surface to account for any in situ reservoir changes which would require a redesigning of the micellar dispersion. Viscosity control, in general, is obtained by varying a number of parameters, including water concentration, particular hydrocarbon, particular sulfonate, cosurfactant (if any), electrolyte (if any) and control of the hydrophile lipophile balance (HLB).

One of the most important parameters for control of viscosity is the aqueous medium concentration of the micellar dispersion. For preferred viscosities of at least 10 cp. at ambient temperature, and preferably in the range of from about 100 to about 2,000 cp. at ambient temperature, depending on the characteristics of the reservoir, the water concentration should preferably be from about 1 to about 50 and more preferably from out 2 to about 25 percent by volume. The general shape of the curve defining the relationship between viscosity and water concentration is depicted in the drawing of U.S. Pat. No. 3,254,714 to Gogarty. This curve demonstrates that the viscosity can go to a maximum at a relatively low concentration of water. At or near this low water concentration, the viscosity of the fracturing agent may be varied within a wide degree by merely monitoring the water concentration within a relatively small range of concentrations. The curve may be shifted with respect to the horizontal and/or vertical axis and also varied somewhat in shape depending on the particular system involved Factors which affect the disposition of the curve (and hence properties of the system) include molecular weight of surfactants, type of hydrocarbon, presence of cosurfactant and presence of electrolyte.

Viscosity control of the fracturing agent is within the skill of those familiar with micellar dispersion design.

Any of a number of commonly employed propping agents may be incorporated within the fracturing fluid and injected into the formation. The higher the viscosity of the fracturing agent, the greater its capacity to carry larger and heavier propping material. Propping agents useful for the present invention include coarse and grains, tempered glass beads, rounded walnut shell fragments, aluminum pellets, and similar materials. Such agents are generally used in concentrations between about 0.1 and about 5 lbs./gallon and preferably about 0.5-3.5 lbs./gallon of fracturing agent. In general, these propping agents with particle sizes of 6 mesh are to about 400, more preferably 10 to about 100 and most preferably 10 to about 20 mesh are employed, depending on the particular reservoir and well to be treated.

One advantage contemplated by the invention is that friction between the injection string and the fracturing fluid (with or without propping agent) will be relatively low, with the result that it is not normally necessary to lubricate the injection string to permit greater injection rates. The micellar dispersions of the present invention tend to be self-lubricating. However, it may be desirable in certain cases especially where extremely high viscosity fluids are to be injected, to coat the injecting string with a material compatible with the micellar dispersion. Since the micellar dispersions are substantially oil-external systems, the lubricating fluid is preferably one which is predominantly miscible with be hydrocarbon phase of the micellar dispersion. Examples of useful lubricating fluids include those hydrocarbons described hereinabove as examples of components of of the micellar dispersion. More preferably, aqueous polymer solutions, exemplified by aqueous solutions of partially hydrolyzed, high molecular weight polyacrylamides, polysaccharides, polyethylene oxides carbon methyl cellulose, carboxy vinyl polymers, and solutions of like materials are employed.

A slug of mobility buffer may follow the injected slug of fracturing fluid This mobility buffer may in turn be followed by a drive fluid of compatible mobility with the mobility buffer. By "mobility buffer" is meant a fluid containing a mobility reducing agent and preferably having a mobility about equal to or greater than the mobility of the fracturing fluid. Preferably, the mobility of the buffer is graded so that the front of it has a mobility about equal to or slightly greater than the back portion of the fracturing fluid. A higher mobility can be characteristic of the trailing edge of the buffer, preferably about equal to or slightly less than the mobility of the following drive fluid, if any. Preferred mobility buffers are the lubricating fluids listed hereinabove, and especially preferred are aqueous solutions of partially hydrolyzed polyacrylamides. A number of drive fluids may be employed, exemplified by brine, water, thickened water, straight-run gasoline, and LPG.

The rates of injection should be sufficiently high to increase the pressure above the fracturing pressure (overburden pressure). These rates will depend upon downhole pressure, permeability of the formation, width of the formation, etc. For most reservoirs, any rate of injection will be sufficient if such imparts a downhole pressure between about 500 and about 5,000 p.s.i.

Prefracturing agents may be injected into the reservoir head of the micellar dispersion, such as acids or surfactant solutions, although in general the fracturing agents of the present invention tend to self-clean the well bore and formation. Also, diverting agents may be intermittently injected to obtain a more uniform fracturing profile—such are recommended in reservoirs containing highly permeable zones.

The following examples specifically illustrate micellar dispersions useful with this invention. Unless otherwise specified, all percents are based on volume. The viscosities of the micellar dispersions are measured at 72° F. On a Brookfield Viscometer. These dispersions are obtained by mixing the surfactant and hydrocarbon and then adding water to obtain the indicated viscosities. Compositions of the micellar dispersions are indicated in Table 1:

TABLE I

| Sample No. | Composition of micellar dispersion | Viscosity (cps.) at 72° F. |
| --- | --- | --- |
| A | 7.5 g. of Shell sulfonate [1]<br>2.5 g. of Pyronate 50 [2]<br>96 ml. hydrocarbon (SRG [3]+VO [4])<br>25 ml. distilled water | 88.5 |
| B | 7.5 g. Petronate K [5]<br>2.5 g. Pyronate 50<br>96 ml. hydrocarbon (SRG+VO)<br>25 ml. distilled water | 170 |
| C | 7 g. Shell sulfonate<br>3 g. Pyronate 50<br>96 ml. hydrocarbon (SRG+VO)<br>25 ml. distilled water | 198 |
| D | 7 g. Petronate K<br>3 g. Pyronate 50<br>96 ml. hydrocarbon (SRG+VO)<br>25 ml. distilled water | 400 |
| E | 5.5 g. Shell sulfonate<br>4.5 g. Pyronate 50<br>96 ml. hydrocarbon (SRG+VO)<br>25 ml. distilled water | >2,000 |
| F | 10 g. Pyronate 50<br>96 ml. hydrocarbon (SRG+VO)<br>25 ml. distilled water | Gel |

[1] Shell sulfonate, sodium petroleum sulfonate, marketed by Shell Chemical Co., 100% active since VO has been extracted, average equivalent weight 460–465.
[2] Pyronate 50, sodium petroleum sulfonate, marketed by Sonneborn Chemical Co., New York, N.Y., 50% active sulfonate, average equivalent weight 360
[3] SRG is straight run gasoline.
[4] VO is vehicle oil obtained from the Shell sulfonate.
[5] Petronate K, sodium petroleum sulfonate, marketed by Sonneborn Chemical Co., New York, N.Y., 62% acitve sulfonate, average equivalent weight 420–450

The invention is not intended to be limited by the foregoing description, rather, all modifications and equivalents obvious to those skilled in the art are intended to be included within the scope of the invention as taught within the specification and appended claims.

What is claimed is:

1. A process of hydraulically fracturing a subterranean hydrocarbon-bearing formation penetrated by at least one wall comprising injecting into the formation, at a pressure sufficient to fracture the formation, a micellar dispersion comprised of hydrocarbon, aqueous medium and surfactant and having a viscosity of at least about 10 centipoises at ambient temperature, thereby fracturing said formation.

2. The process of claim 1 wherein the surfactant is petroleum sulfonate.

3. The process of claim 1 wherein propping agent is incorporated within the micellar dispersion.

4. The process of claim 1 wherein the viscosity of the micellar dispersion is monitored by varying the relative concentration of hydrocarbons, aqueous medium, and/or surfactant of the micellar dispersion.

5. The process of claim 4 wherein the viscosity is monitored by varying the selection of particular hydrocarbon, aqueous medium or surfactant employed.

6. The process of claim 4 wherein the viscosity is monitored by additionally incorporating a selected amount of cosurfactant into the micellar dispersion.

7. The process of claim 4 wherein the viscosity is monitored by additionally incorporating a selected amount of electrolyte into the micellar dispersions.

8. The process of claim 1 wherein the viscosity of the micellar dispersion is between about 100 and about 2,000 centipoises at ambient temperature.

9. The process of claim 1 wherein the injection pressure of the micellar dispersion is within the range of about 500 to about 5,000 p.s.i.

10. The process of claim 1 wherein the aqueous medium concentration within the micellar dispersion is about 1 to about 70 percent by volume.

11. The process of claim 1 wherein %e aqueous medium concentration within the micellar dispersion is about 1 to about 50 percent by volume.

12. The process of claim 1 wherein the hydrocarbon is crude oil or a partially refined fraction of crude oil.

13. The process of claim 1 wherein the surfactant is an alkylaryl naphthenic sulfonate having an average equivalent weight of about 350 to about 520.

14. A process of hydraulically fracturing a subterranean hydrocarbon-bearing formation penetrated by at least one injection means comprising injecting into the formation at a pressure sufficient to fracture the formation, a micellar dispersion comprised of hydrocarbon, about 1 to about 50 percent by volume aqueous medium at least 4 percent surfactant having an average equivalent weight within the range of about 350 to about 520 and the micellar dispersion having a viscosity of at least about 10 cp. at ambient temperature, thereby fracturing the formation.

15. The process of claim 14 wherein the equivalent weight of the sulfonate is within the range of about 90 to about 460.

16. The process of claim 14 wherein the micellar dispersion contains cosurfactant and/or electrolyte.

17. The process of claim 14 wherein the micellar dispersion contains propping agents.

18. The process of claim 17 wherein the micellar dispersion contains about 0.1 to about 5 lbs. of the propping agent per gallon of the micellar dispersion.

19. The process of claim 14 wherein the micellar dispersion is designed to have a viscosity within the range of about 100 to about 2,000 cp. at ambient temperature.

UNITED STATES PATENT OFFICE
CERTIFICATE OF CORRECTION

Patent No. 3,603,400  Dated Sept. 7, 1971

Inventor(s) Marion O. Son, Jr.

It is certified that error appears in the above-identified patent and that said Letters Patent are hereby corrected as shown below:

| | |
|---|---|
| Col. 1, line 56: | After "about" insert --10-- |
| Col. 2, line 3: | After "dispersion" delete --A--. |
| Col. 2, line 59: | Delete "2-butoxychanol," and insert --2-butoxyethanol--. |
| Col. 3, line 5: | Delete "table" and insert --suitable--. |
| Col. 3, line 6: | After "stirring," Delete "A" and insert --or--. |
| Col. 3, line 20: | Delete "bproduce" and insert --to produce--. |
| Col. 3, line 23: | After "reservoir" insert --.--. |
| Col. 3, line 39: | Delete "out" and insert --about--. |
| Col. 3, line 50: | After "involved" insert --.--. |
| Col. 3, line 62: | Delete "and" and insert --sand--. |
| Col. 3, line 67: | Delete "mesh are". |
| Col. 4, line 7: | Delete "be" and insert --the--. |
| Col. 4, line 10: | Delete "of of" and insert --of--. |
| Col. 4, line 17: | After "fluid" insert --.--. |
| Col. 4, line 40: | Delete "head" and insert --ahead--. |
| Col. 5, line 17: | Delete "wall" and insert --well--. |
| Col. 6, line 9: | Delete "%e" and insert --the--. |

Signed and sealed this 14th day of March 1972.

(SEAL)
Attest:

EDWARD M. FLETCHER, JR.
Attesting Officer

ROBERT GOTTSCHALK
Commissioner of Patents